(12) United States Patent
Hermey et al.

(10) Patent No.: US 12,584,538 B2
(45) Date of Patent: Mar. 24, 2026

(54) ENERGY CHAINS FOR LONG TRAVELS, IN PARTICULAR WITH ROLLERS

(71) Applicant: IGUS GMBH, Cologne (DE)

(72) Inventors: Andreas Hermey, Hennef (DE); Ralf Steeger, Lohmar (DE)

(73) Assignee: IGUS GMBH, Cologne (DE)

( * ) Notice: Subject to any disclaimer, the term of this patent is extended or adjusted under 35 U.S.C. 154(b) by 332 days.

(21) Appl. No.: 18/256,787

(22) PCT Filed: Dec. 10, 2021

(86) PCT No.: PCT/IB2021/000853
§ 371 (c)(1),
(2) Date: Jun. 9, 2023

(87) PCT Pub. No.: WO2022/123308
PCT Pub. Date: Jun. 16, 2022

(65) Prior Publication Data
US 2024/0026953 A1 Jan. 25, 2024

(30) Foreign Application Priority Data
Dec. 10, 2020 (DE) ..................... 20 2020 107 151.3

(51) Int. Cl.
*F16G 13/16* (2006.01)

(52) U.S. Cl.
CPC .................................... *F16G 13/16* (2013.01)

(58) Field of Classification Search
CPC .............................. H02G 11/006; F16G 13/16
See application file for complete search history.

(56) References Cited

U.S. PATENT DOCUMENTS 3,948,041 A * 4/1976 Borjesson ............... F16G 13/16
59/78.1
7,444,800 B2 11/2008 Hermey
(Continued)

FOREIGN PATENT DOCUMENTS

CZ 241597 A3 * 6/2000
DE 112004000584 10/2008
(Continued)

OTHER PUBLICATIONS

Translation of EP-2010802.*
(Continued)

*Primary Examiner* — Bobby Yeonjin Kim
(74) *Attorney, Agent, or Firm* — Grossman, Tucker, Perreault & Pfleger, PLLC

(57) ABSTRACT

Energy chains for guiding lines, such as cables, hoses or the like. In roller chains, rollers are provided on at least some chain links for moving the energy chain in a rolling manner, in particular on chain links of the opposite run, the rotational axis of one roller in each case coinciding with the common pivot axis of a pair of side parts of the chain links. Each of the two strands consists of alternatingly successive first and second side parts, wherein the first side parts are forked with two fork regions which oppose each other in the longitudinal direction and each have a pair of laterally spaced side walls with a plate receptacle therebetween, and wherein the second side parts are plate-like with two plate regions which oppose each other in the longitudinal direction and each engage in a plate receptacle of an adjacent first side part.

20 Claims, 8 Drawing Sheets

(56) References Cited

U.S. PATENT DOCUMENTS

| | | | |
|---|---|---|---|
| 7,497,072 B2 | 3/2009 | Hermey | |
| 7,500,346 B2 | 3/2009 | Blase | |
| 9,188,194 B2 | 11/2015 | Hermey | |
| 2021/0364063 A1 | 11/2021 | Strack et al. | |

FOREIGN PATENT DOCUMENTS

| | | | |
|---|---|---|---|
| DE | 202017105644 | 12/2017 | |
| DE | 202019105730 | 11/2019 | |
| EP | 2010801 | 6/2009 | |
| EP | 2010800 | 7/2011 | |
| EP | 2549144 | 1/2013 | |
| EP | 2010802 | 1/2014 | |
| EP | 2010802 B1 * | 1/2014 | ............. F16G 13/16 |
| JP | 2008-275114 | 11/2008 | |
| TW | 201447139 | 12/2014 | |
| TW | 201738483 | 11/2017 | |
| WO | 99/57457 | 11/1999 | |
| WO | WO-9957457 A1 * | 11/1999 | .......... H02G 11/006 |
| WO | 2004/092614 | 10/2004 | |
| WO | 2013/156469 | 10/2013 | |
| WO | 2020/188044 | 9/2020 | |

OTHER PUBLICATIONS

Translation of CZ-241597.*
Translation of WO-9957457.*
Office Action from related Taiwanese Appln. No. 110146452, dated Feb. 20, 2025. English translation attached.
International Preliminary Report on Patentability from corresponding PCT Appln. No. PCT/IB2021/000853, dated Jun. 22, 2023.
International Search Report from corresponding PCT Appln. No. PCT/IB2021/000853, dated May 6, 2022.
Office Action from related Japanese Appln. No. 2023-534268, dated Nov. 13, 2025. English translation attached.

* cited by examiner

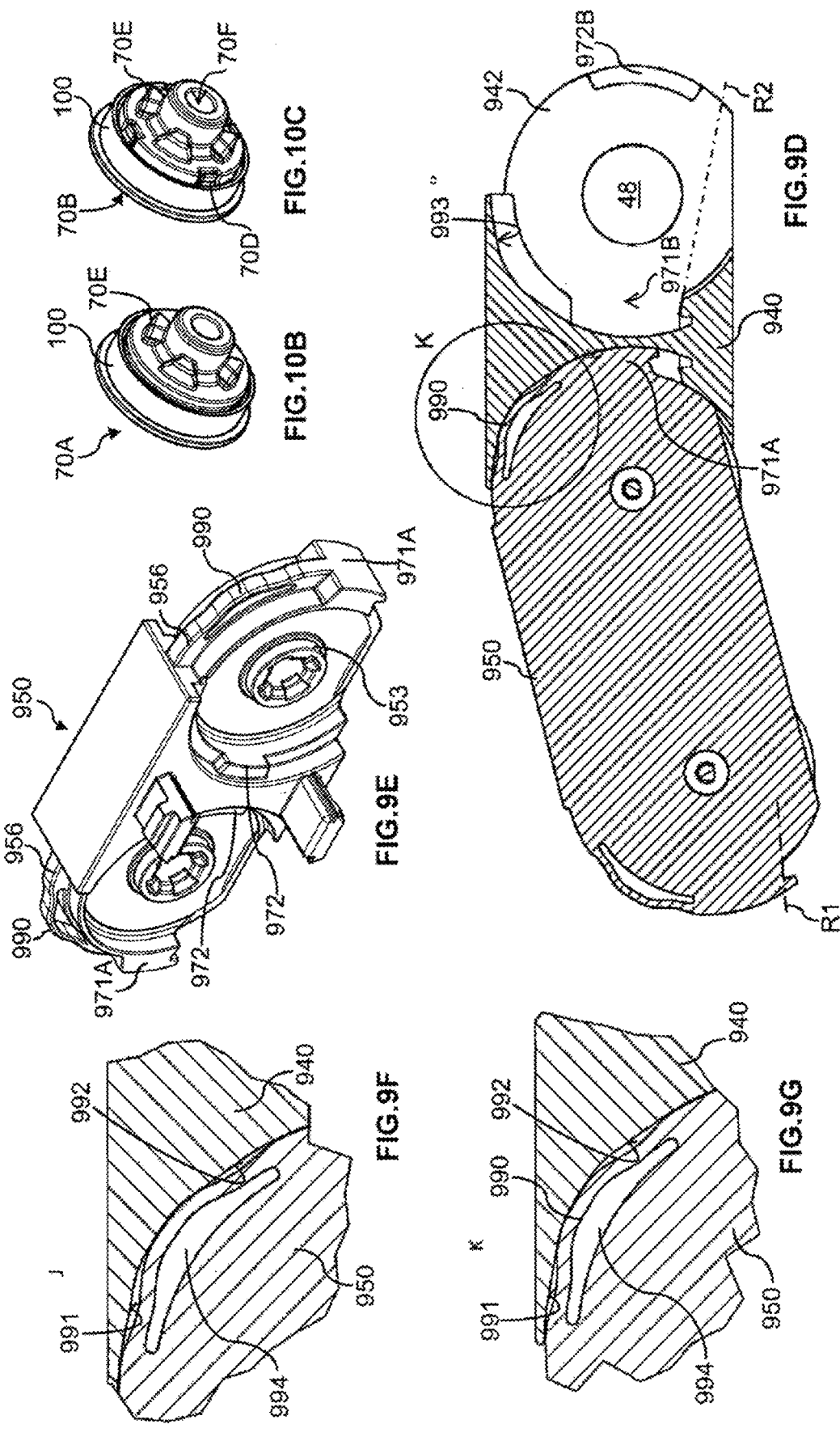

ENERGY CHAINS FOR LONG TRAVELS, IN PARTICULAR WITH ROLLERS

FIELD

The invention relates generally to energy chains for dynamically guiding lines, in particular supply lines such as cables and hoses or the like, and specifically to energy chains for particularly long travels.

According to one aspect, the invention relates in particular but not exclusively to energy chains which are equipped with rollers which make it possible for the energy chain to roll during movement. Such energy chains are also called roller chains. According to further aspects, however, the invention also relates to energy chains which can be designed sliding, i.e. where appropriate without rollers, for the purposes of reducing forces that arise.

BACKGROUND

In a tried and tested design energy chains have chain links which are connected to each other in an articulated manner and which form a receiving space for protecting the lines to be guided. The chain links comprise side plates parallel to each other. The side plates or side parts are connected in the longitudinal direction to form in each case two laterally opposite strands or so-called plate strands, which are in turn connected to each other and typically held parallel to each other by traverses or cross bars. In each case two chain links neighbouring in the longitudinal direction are, in each case with their side parts, pivotable with respect to each other about a common pivot axis.

In the case of long travels, the energy chain is typically movable such that it forms a type of loop, with an upper run, a lower run and a deflection region connecting the two runs. It is typical in the case of long travels that the upper run is movable resting on the lower run, either in a rolling manner (roller chain) or else in a sliding manner (sliding chain).

Such a generic energy chain is known e.g. from EP2010802B1. This is equipped with rollers on at least some chain links, which allow a rolling movement of the energy chain, namely the chain links of the upper run on the chain links of the opposite lower run. The forces that arise, in particular tensile forces, are thus substantially reduced, or particularly long travels, sometimes considerably more than 100 m, are made possible in the first place.

In the case of the energy chain according to EP2010802B1 the axis of rotation of the rollers is in each case arranged coaxial with the pivot axis of the corresponding pair of side parts connected in an articulated manner, or coincides with it. EP2010802B1 discloses an energy chain according to the preamble from claim 1 and is regarded as the closest state of the art for the subject-matter thereof. In practice, this design has already proved to be very successful. Structurally, however, it requires at least six different side parts, in each case a cranked plate and a pair of two special plates for the rollers, wherein these side parts have to be produced mirrored for each plate strand, i.e. in two mirror-image embodiments.

The applicant has disclosed further energy chains with rollers for long travels in WO 99/57457 A1 (cf. FIG. 1), in EP2010800B1, in EP2010802B1 or also in WO 2013/156469 A1.

Further examples of previously known energy chains with rollers are found in EP2549144A1 as well as in DE 20 2019 105 730 U1. In the two last-named documents it is proposed to mount the guide rollers movably or damped on the plates.

This is structurally complex and high-maintenance. Moreover, the design proposed herein only makes comparatively small diameters of the rollers possible, which is disadvantageous among other things for a running that is as quiet as possible or the running smoothness.

SUMMARY

According to a first aspect of the invention, a first object starting from the above-named state of the art is to propose a design of an energy chain with rollers which is as robust as possible and which on the one hand offers a good running smoothness and on the other hand is easier to produce. In particular, the number of different side parts needed is to be reduced.

According to an independent second aspect, the transverse stabilization in the case of energy chains, in particular sliding or rolling energy chains for long travels, is to be improved. According to an independent third aspect, the flow of forces between the side parts connected in an articulated manner in their extended position is to be improved. Further independent aspects of the invention follow from the description below.

First Aspect

The above-named first object is achieved, in particular in the case of an energy chain with rollers, in core aspects by a particular application of the principle of fork chain plates. For this, two alternative design variants come into consideration according to the invention.

According to a first variant of the first aspect, it is provided according to the invention that each of the two strands (plate strands) consists of first side parts and second side parts different therefrom succeeding each other in an alternating manner, wherein the first side parts are designed—in the manner of double fork plates—fork-like on both end sides, namely with two fork regions which are opposite each other in the longitudinal direction and which have in each case a pair of laterally spaced-apart side walls, between which in each case a plate receiver is formed. Correspondingly, the second side parts are designed, in a corresponding type, in the manner of double plates or double fork plates, namely with two plate regions which are opposite each other in the longitudinal direction and which can in each case engage in a plate receiver in the fork-like region of a neighbouring first side part.

According to a second alternative to the first aspect, it is provided according to the invention that each of the two strands (plate strands or side strands) consists of successive side parts which are designed similar to single-sided fork plates. Here, each of these fork plates has, on one side, a fork region, which has a pair of laterally spaced-apart side walls with a plate receiver lying in between them. On the other side, or lying opposite in the longitudinal direction, the fork plate has a plate region, which can engage in a corresponding plate receiver of a neighbouring side part. The successive side plates can then be identical or identically constructed.

Through these comparatively simple design measures, two substantial advantages are combinatorially achieved. If a high stability of the connection between the individual side parts and the plate strands is achieved overall, in particular a high lateral stability, at the same time the necessary number of different side parts for the structure of the plate strands is reduced to only two components (first variant) or even to only one necessary side part per strand (variant two). This reduces the production costs and the storage costs, and in addition noticeably simplifies the installation of the side parts to form the plate strands or chain links.

Two further substantial advantages or properties of both alternatives of the first aspect are, on the one hand, that a continuously unchanging chain pitch over at least the predominant part or the whole of the length of the chain is made possible. This is advantageous among other things for the dynamic behaviour. On the other hand, the proposed design also allows uniform, in each case identical, hinged connections between the chain links. Here, in particular for each hinged connection, a separate hinge pin, e.g. made of a more favourable or more suitable material, can be used. As a result of this, the lifespan can be increased, maintenance can be simplified and/or a retrofitting or repair without exchanging side parts can be made possible.

The fork principle is furthermore advantageous with respect to transverse stability in the lateral direction and torsional strength of the plate strands, which is particularly significant for the tracking ability in the case of long chains.

In a preferred design, all side parts of each strand are thus connected to each other pivotally in each case by separate hinge pins, for forming the typical hinge/pin swivel connection between the chain links. In addition, this simplifies the installation of separate mountings, e.g. by ball bearings or sliding bearings, for the rollers or the swivel connection.

With respect to the specification that the strands consist of or are constructed from two alternating or one identical side part type, the term strand (plate strand/chain strand) is to be understood as a chaining or sequence of side parts connected to each other extending at least over the predominant part of the length of the energy chain, i.e. a number of side parts with in any case at least three side parts, typically at least a few hundred side parts. End-side connector elements for each strand at the movable and stationary ends of the chain can be designed differently as required. The term strand/ plate strand can in particular be understood as the complete sequence of side parts, except for the connector elements.

In combination with a coaxial arrangement of the rollers, with the result that their axes of rotation coincide with the pivot axis of two side parts connected in the manner of a swivel joint, rollers with a large diameter can be used, without the chain pitch being increased, i.e. a chain pitch as short as possible can be achieved. Despite the reduced number of parts, a particularly good running smoothness is thus furthermore achieved. A further substantial advantage of the proposed design according to the first aspect is thus to make comparatively large roller diameters possible in the case of a short chain pitch, and thus to achieve a particularly quiet running during the rolling. In particular, roller diameters larger than 50%, in particular larger than 75%, of the plate height can be used, which is to be seen as an advantageous aspect independently of other features.

Here, it is not necessary to provide rollers on each pair of connected side plates. Rollers can be provided only for every n-th chain link, where n>>2. The rollers are preferably inserted in the side parts and protrude exposed towards the inside of the loop or the inner region in order to be able to roll on the opposite run. Through the use of rollers, each plate strand can roll in a low-friction manner relative to the opposite run. This reduces forces occurring during operation, in particular tensile forces, i.e. the wear, and/or overall allows larger travels with a long lifespan.

The side parts typically have a narrow side facing the respectively other run and a narrow side facing away from it. The narrow sides generally lie in the longitudinal direction and can run substantially parallel to the longitudinal direction of the energy chain.

In a preferred development, it is provided that the distance from the pivot axis of two connected side parts or chain links to the narrow side facing the other run is smaller than the distance to the narrow side facing away.

The narrow side facing the other run is particularly preferably designed such that in the extended configuration or in the extended position of the runs it forms a substantially continuous running surface, on which the opposite run can slide and/or can roll in particular by means of rollers.

A pivot axis arranged correspondingly asymmetrically or eccentrically allows, with respect to the coaxial arrangement of the axis of rotation of the rollers, an additional increase in the roller diameter and also a reduction of the technically necessary clearances between the side parts. The continuous running surface is preferably realized laterally next to the plane of the rollers (or is to be understood as the running surface without rollers).

In an embodiment, every pair of connected side parts can in each case have at least one roller. In particular, rollers made of plastic can be used.

For the purposes of weight reduction and at the same time simplification of the installation, in a preferred development it is provided that in particular all side parts used, in particular the first side parts designed fork-like and/or also the second side parts designed plate-like, are in each case produced in one part from plastic, in particular from fibre-reinforced plastic. This allows a weight-saving and low-cost production of the side parts as plastic injection-moulded parts.

A particularly preferred development—which is to be regarded as an independent second aspect or as significant for the invention in itself (see below)—provides that, in relation to a connected side part pair, one side part, between the side walls of its fork region, forms a guide groove which is open towards the plate receiver and which has laterally opposite transverse guide surfaces which extend substantially in a circular arc shape about the pivot axis. Here, the plate region of the connected other side part advantageously has at least one guide protrusion, which forms circular-arc-shaped counterfaces for guiding on the transverse guide surfaces of the guide groove. The guide protrusion can thus engage in the guide groove for additional or increased lateral stabilization, because the counterfaces are guided laterally by the transverse guide surfaces. A corresponding guide groove and a corresponding guide protrusion can preferably be arranged centrally, in particular symmetrically, relative to the longitudinal centre plane of the side plate (longitudinal direction) and/or between in each case two provided rollers. The transverse guide surfaces and cooperating counterfaces extend in particular in planes parallel to the longitudinal direction or perpendicular to the pivot axis.

In an advantageous development—according to a third aspect that is independently significant for the invention (see below)—it can be provided that, in relation to a connected side part pair, the two connected side parts together have at least or precisely three pairs of cooperating extension stop surfaces which are spatially separated and arranged distributed about the pivot axis. These extension stop surfaces are in contact with each other in the extended position (extended pivot position of both side parts of the connected pair) and, through their number and arrangement, make a particularly favourable flow of forces possible, as well as a load relieving of the hinged connection between the side parts with respect to shearing forces, in particular but not exclusively in self-supporting parts or between deflecting arc and moving end connector. The pairs of cooperating extension stop surfaces can be arranged on the respective side part approximately equally distributed relative to each other in terms of angle about the pivot axis. Approximately equally distributed means here in particular distributed roughly with an angle distance of 120°+/−approx. 15°-30° about the pivot axis in the stop-effective extended position, viewed in a plane perpendicular to the pivot axis.

In particular but not exclusively in the case of the last-named development, it is advantageous if, in relation to a connected side part pair, one side part has a draw hook which, in the extended pivot position, engages in or behind a cutout, undercut or the like on the other side part for the purposes of tensile force transmission.

Embodiments with corresponding draw hooks are generally advantageous for energy chains, irrespective of the chosen design of the side plates, and in this respect are to be regarded as an independent aspect of the invention.

The draw hook can preferably be formed on or by a stop tongue or a stop protrusion, which at the same time forms one of the above-named extension stop surfaces. Such a stop protrusion can in particular engage in a stop recess, provided for this, of the respectively other side part.

To prevent susceptibility to failure and to protect the rollers and their mounting, the rollers are in each case preferably received in receivers between the neighbouring side parts. The rollers can protrude beyond the narrow side of the respective side parts only to a comparatively small extent or only slightly. In particular, overlap or longitudinal distance between rollers can be such that a sliding of further, roller-free chain links provided between roller-carrying chain links is prevented.

In conjunction with the first aspect, preferably each roller is arranged preferably between a side wall of a fork region and the plate region engaging in the receiver of this fork region, i.e. within the plate receiver between overlapping wall regions of the side parts.

On roller-carrying side part pairs, in each case two separate rollers with the same axis are particularly preferably provided on both sides of the plate region in the plate receiver or a free space for this. An arrangement with in each case two rollers on the chain links is advantageous particularly in the case of very heavy line filling and, thanks to narrower rollers, makes a laterally offset rolling easier, with the result that the rollers do not ride over each other. With an internal sub-region, the plate receiver thus at the same time acts as a roller receiver, with the result that the construction is further simplified and much more stable central regions of the plates are made possible. It is also possible, e.g. in the case of less heavy filling, to provide in each case only one roller in a laterally alternating manner on roller-carrying side part pairs, even if they are designed for two rollers.

With respect to the running surfaces for rollers arranged in pairs, it is preferably provided that on the narrow side of the side parts facing the respectively other run both at least one side wall of the fork region and the plate region engaging therein in each case form or provide a running surface section for one of the two rollers. The running surface sections in the longitudinal direction at the level of the rollers lie laterally offset next to the roller or rollers. Sections of the running surface succeeding each other in the longitudinal direction preferably form, in between them, a gap reduced to the technically necessary minimum in the extended position.

For mechanically robust and in particular low-wear hinged connections between the chain links, a development provides that the two side walls of each fork region and the plate region engaging therein in each case have a receiving opening, which is continuous in the transverse direction, for a separate hinge pin. Thus, the side parts can be connected to each other in a relatively pivotable manner by a separate hinge pin, which can be installed through the aligned receiving openings. Thus, the hinge pin can be produced from a plastic with tribological additions for a favourable tribological pairing and/or from a plastic different from the plastic of the side parts. A hinge pin made of metal is also conceivable. To simplify the installation, the hinge pin is preferably designed in two parts in order to be able to be smoothly inserted from both sides and in order to be assembled using suitable connection technology, for example a screw connection.

In an embodiment preferred for the simplified installation, the hinge pin preferably comprises two pin parts, in particular made of plastic, which are screwed together by at least one, preferably by precisely one, screw. As screw, a self-tapping tapping screw, preferably made of stainless steel, can preferably be used for plastic. Thus, the screw can be screwed into a core hole of one of the pin parts in a simple work step. If a single screw is used for the installation of the hinge pin, it is preferably coaxial with the pivot axis.

At least the pin part of the separate hinge pin that cooperates with the screw(s) is preferably connected in a torque-proof manner to a side part, in particular the internal plate region, for example by a suitable positive locking of protrusions and/or depressions or lugs and depressions designed joined. On the hinge pin arranged correspondingly torque-proof on the plate region after screwing, in the respective fork region, its two side walls can then be mounted on the fork region pivotably about the pivot axis defined by the hinge pin by means of their receiving openings. This allows among other things a hinged connection which is particularly stable in the transverse direction, i.e. further increases the lateral stability.

According to a further advantageous design, it can be provided that in each case a sliding bearing ring, e.g. made of a tribopolymer, is provided for the pivotable mounting of the side walls. This makes an optimized sliding bearing pairing possible. The sliding bearing ring can in particular be connected rotatably to the hinge pin or provided thereon and at the same time be connected in a torque-proof manner to one of the side walls, with the result that sliding friction only arises between hinge pin and sliding bearing ring, and a repair to re-establish a play-free hinged connection is made possible. The torque-proof fastening to the receiving opening can be brought about by oversizing the sliding bearing ring or a press fit, without additional effort during the screwing of the carrying hinge pin.

The rollers are in each case preferably arranged mounted rotatably on the hinge pin, with the result that a further simplification is achieved and the replacement of the rollers or the mounting thereof is made easier. The rollers can in particular be mounted on the hinge pin with the aid of suitable ball bearings in order to achieve a movement that is as low-friction as possible or a long lifespan.

Through the first-named aspect, it can be achieved according to the invention that in both strands in each case identically constructed side parts are provided, in particular in each case identical fork-like first side parts and identical plate-like second side parts, which are arranged succeeding each other in an alternating manner and are connected to form plate strands.

In particular in the first variant of the first aspect, the side parts of the first and/or of the second type can advantageously be designed substantially mirror-symmetrical or functionally symmetrical in particular with respect to their transverse centre plane (plane perpendicular to the longitudinal direction). Functionally symmetrical means here that the same side parts are usable equivalently in both strands by corresponding rotation, wherein where appropriate only the fastening of the cross bars is to be adapted. Cross bars between the plate strands need not necessarily be provided on every chain link.

With respect to their spatial arrangement and geometry, the first side parts with fork regions on both sides can be regarded as outer plates or chain links formed thereof can be regarded as outer links. Accordingly, the second side parts lying inside between the forks can be regarded as inner plates or chain links formed thereof can be regarded as inner links.

According to the first aspect, it can be provided in particular that the strands have roller-carrying side part pairs and roller-free side part pairs. Here, the side parts are in themselves preferably identically constructed (without rollers and their mounting).

If roller-free side part pairs are provided, it is advantageous to seal the receivers, which are otherwise open on the narrow sides, for the rollers in the roller-free side part pairs using a suitable sealing surface. This can be achieved either by providing a separate insert with a sealing surface in the free space of the roller receiver instead of the rollers or else by also preforming corresponding laterally extended sealing surfaces in particular on the plate region, on the side parts of the roller-free side part pairs. The latter can already be achieved during production, in particular by suitable adaptation of the injection-moulding method, with little effort. Otherwise, however, the side part with sealing surface can be constructed identically to the corresponding side part of the roller-carrying side part pair. Thus, the narrow side can also be closed in a protecting manner in the case of roller-free side parts and among other things undesired dirt accumulation can be reduced or prevented.

With respect to a good running smoothness, it is advantageous if the external diameter of the rollers corresponds to at least 50%, preferably at least 66%, particularly preferably at least 75%, of the height of the side parts, i.e. the distance from narrow side to narrow side, in particular in relation to the side part constructed higher in the case of unequal height, such as for example the fork-like first side part. However, the first and second side parts preferably have equal heights.

In a preferred development, the upper run runs slightly laterally offset rolling on the lower run, in particular on the above-named running surfaces that are as far as possible continuous. To achieve a suitable lateral offset between the extended runs, guide elements, which are designed such that the guide elements engage with each other during movement, are preferably provided on the outside on the or on at least some cross bars of the chain links which face the respectively other run. The guide elements can in particular be comb-like and mesh with each other and bring about the desired lateral offset of the upper run with respect to the lower run. A substantial advantage here is that the rollers can roll past each other and need not roll over each other, i.e. undesired jumping of the upper run is prevented. Furthermore, it is possible where appropriate to prevent the use, typical in the case of long travels, of guide channels through corresponding guide elements on the cross bars. This reduces the system costs.

Second Aspect

To achieve the second object named at the beginning, it is provided according to the independent second aspect, in particular in the case of an energy chain, that, in relation to a connected side part pair, one side part, between the side walls of the fork region, forms a guide groove which is open towards the plate receiver and which has laterally opposite transverse guide surfaces which extend in a circular arc shape about the pivot axis, and that the plate region of the connected, next or other side part with at least one guide protrusion, which has circular-arc-shaped counterfaces for guiding on the transverse guide surfaces, engages in the guide groove of the one side part. Guide groove and guide protrusion are preferably arranged centrally, in particular symmetrically, relative to the longitudinal centre plane of the side parts. The transverse guide surfaces and counterfaces preferably lie parallel to the main plane of the side parts, i.e. in the longitudinal and height direction.

Through this design, the guide protrusion can engage in the guide groove for increased lateral stabilization, because the counterfaces are guided laterally by the transverse guide surfaces. A corresponding guide groove and a corresponding guide protrusion can preferably be arranged centrally, in particular symmetrically, relative to the vertical longitudinal centre plane of the side plate (longitudinal direction) and/or between in each case two provided rollers. The transverse guide surfaces and cooperating counterfaces extend in particular in planes parallel to the longitudinal direction or perpendicular to the pivot axis.

However, the second aspect is not limited to energy chains with rollers, but in particular is also advantageous for sliding energy chains or e.g. laterally lying moving energy chains.

In particular in combination with the second aspect, a stop damping is advantageously provided, in the form of an arc-shaped damping bridge which protrudes in the radial direction in relation to the pivot axis from a guide protrusion of a side plate, in particular over a cutout, or projects radially beyond the outer other radius of the guide protrusion. The arc-shaped damping bridge is preferably produced in one part with the guide protrusion or the side part and is pivotable in a corresponding depression in the other side part, in particular in or on the guide groove, which forms approach surfaces or approach slopes for the damping bridge.

The damping bridge and depression are preferably arranged such that the damping bridge is effective in both pivot directions, i.e. in the direction of the extended position and in the direction of the completely bent relative position of the side parts, i.e. slows down or damps the pivoting movement. The arrangement is preferably chosen such that a damping of the pivoting movement only occurs in the end region of the pivoting movement, e.g. in the case of approx. 5° angular dimension before reaching the two stop positions. The depression can be shaped such that its approach surfaces or approach slopes in each case bring about a deformation, increasing or stronger towards the end position, of the damping bridge in the direction of the assigned cutout. The damping bridge can, in addition to the bending deformation, also have a smaller wedge action with the approach surfaces or approach slopes.

Third Aspect

To achieve the third object named at the beginning, it is provided according to the independent third aspect, in particular in the case of an energy chain, that, in relation to a connected side part pair, both connected side parts have at least or precisely three pairs, arranged distributed about the pivot axis, of cooperating extension stop surfaces which are in contact in the extended pivot position of both side parts and are preferably arranged approximately equally distributed in terms of angle about the pivot axis. The pairs of cooperating extension stop surfaces are particularly preferably arranged on the respective side part approximately equally distributed in terms of angle relative to each other about the pivot axis. Approximately equally distributed means here in particular distributed roughly with an angle distance of at least 90° about the pivot axis in the stop-effective extended position, viewed in a plane perpendicular to the pivot axis.

These designs make a favourable force transmission between the chain links in the extended position and/or a load relieving of the pivot axes or hinge pins possible, which has an advantageous effect in particular in the case of particularly long energy chains, which is particularly advantageous in the case of roller chains or sliding chains.

Fourth Aspect

To achieve favourable flows of forces in an energy chain, it is proposed as a further independent aspect, generally for every type of energy chain, that, in relation to a connected side part pair, one side part has a draw hook which, in the extended pivot position of both side parts, engages in a corresponding cutout on the other side part and thus makes a tensile force transmission possible in the longitudinal direction via the draw hook. Among other things, the hinged connection is hereby also load-relieved, which is advantageous particularly in the case of long chains.

Further features according to the preceding preferred developments of the first, second and third aspects can advantageously be combined with each other, as the following embodiment examples show. In particular the third and fourth aspects are not limited to energy chains with rollers.

The invention also relates to a side part pair, as a single module, for an energy chain consisting of two side parts connected in an articulated manner having the features according to one of the above-named aspects and/or one of the above-named advantageous developments.

An energy chain, in particular roller chain, within the meaning of the invention is in particular, but not exclusively, advantageous in the use for long travels, in particular travels longer than 100 m, and/or for high speeds.

Energy chains on crane systems, in particular on ship-unloading cranes, represent one of many industrial applications.

Advantageous features of all aspects can be combined with each other and in each case are to be understood as significant for the invention in themselves.

BRIEF DESCRIPTION OF THE DRAWINGS

Further details, features and advantages of the invention follow, without limiting the above, from the detailed description below of preferred embodiment examples with the aid of the attached illustrations. There are shown in:

FIGS. 2A-2D: partial views of a rolling energy chain according to a first embodiment example in a side view (FIG. 2A), an enlargement from that (FIG. 2B), in a front view of two rolling chain links (FIG. 2C) and in a top view (FIG. 2D);

Figures 3A, 3B, 4A, 4B:
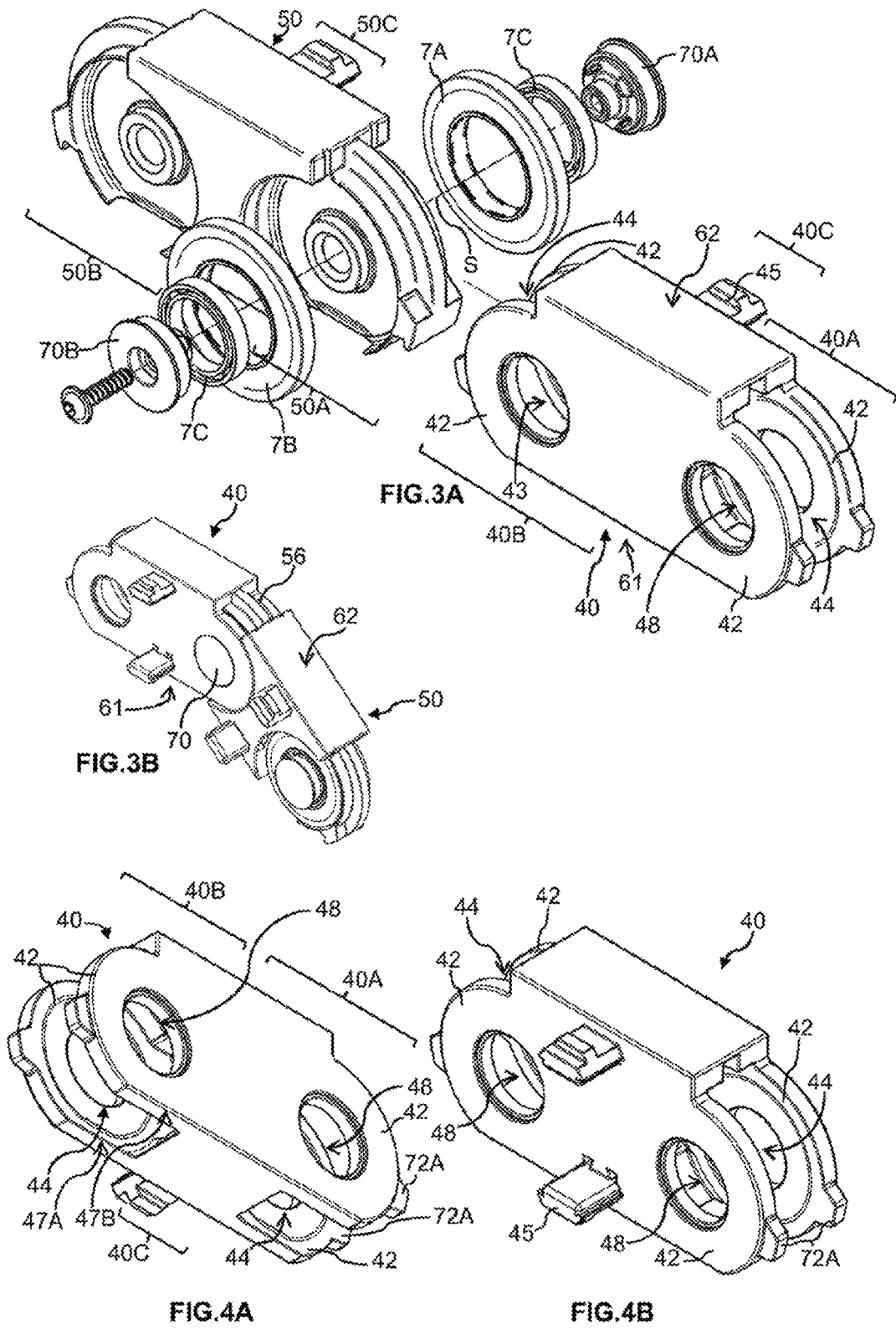
FIGS. 3A-3B: perspective views of a pair of two side parts of a first and second type of the energy chain from FIGS. 2A-2D, in a disassembled exploded view (FIG. 3A) and connected in an installed, bent pivot position (FIG. 3B) of the two side parts.
FIGS. 4A-4E: perspective views (FIGS. 4A-4B) of a double-sided fork plate or outer plate as first side part from FIGS. 3A-3B, as well as a longitudinal section (FIG. 4C)
Figures 4C, 4D, 4E, 5A, 5B, 6A, 6B, 6C, 6D:
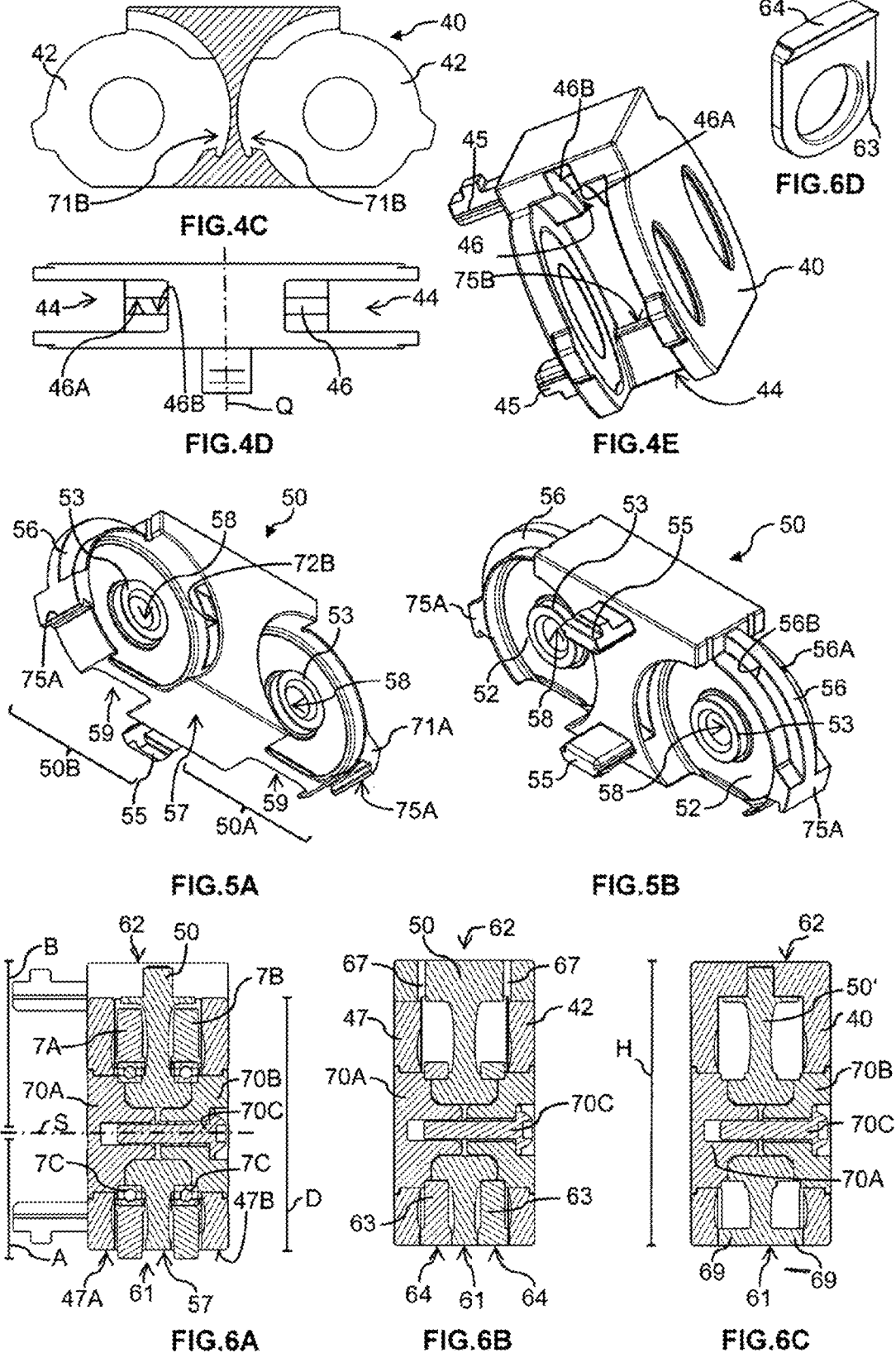
Figures 7A, 7B, 7C:
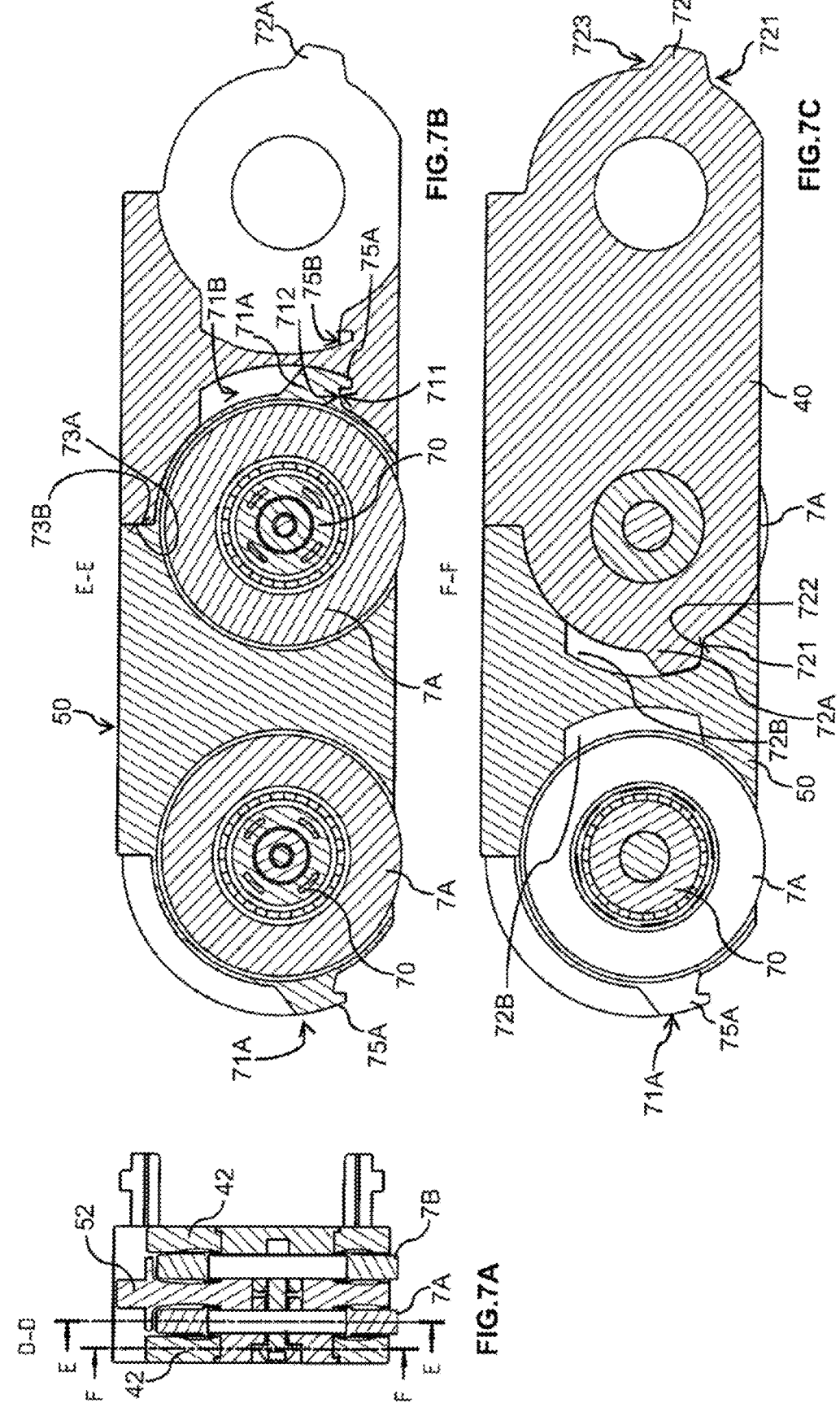
Figures 7D, 7E, 7F:
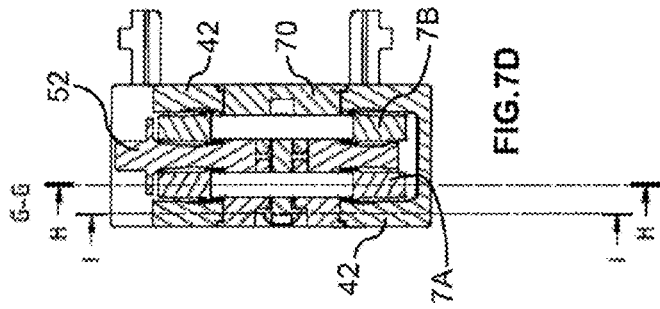
Figure 8A:
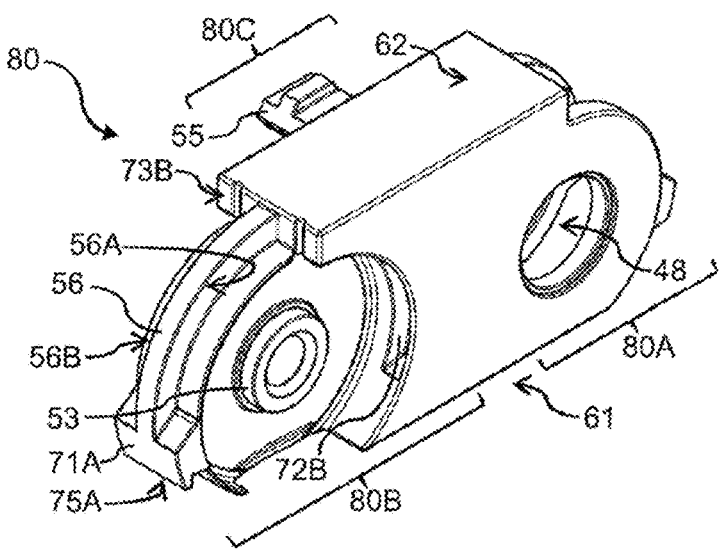
Figure 8D:
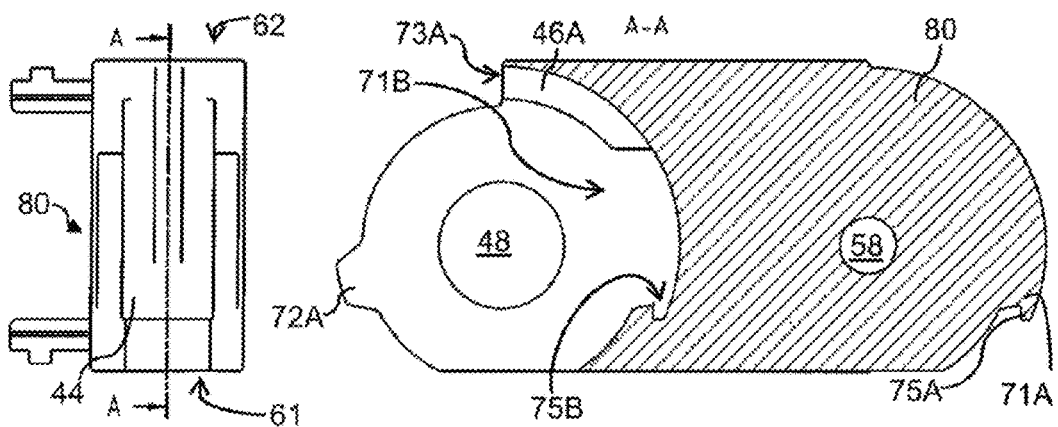
Figure 8D:
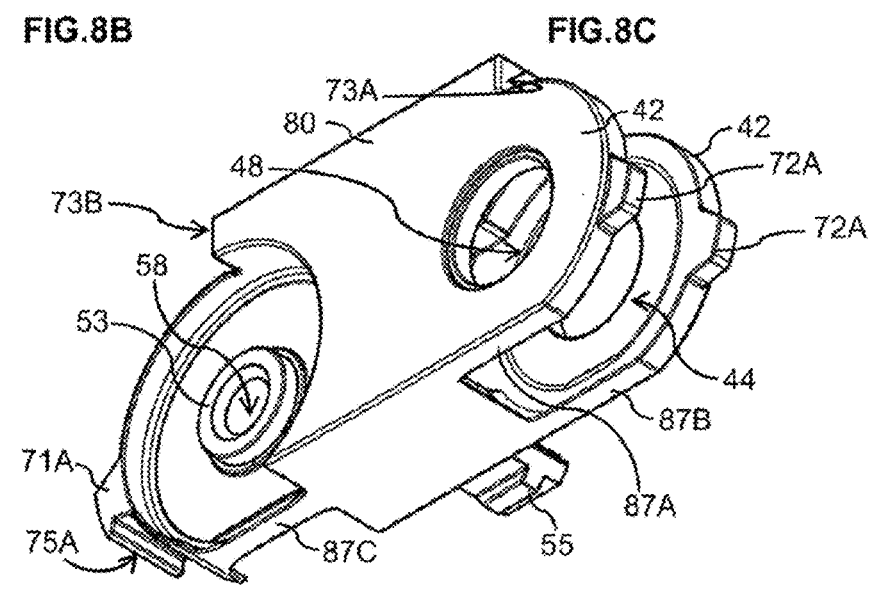
Figures 9A, 9B, 9C, 10A:
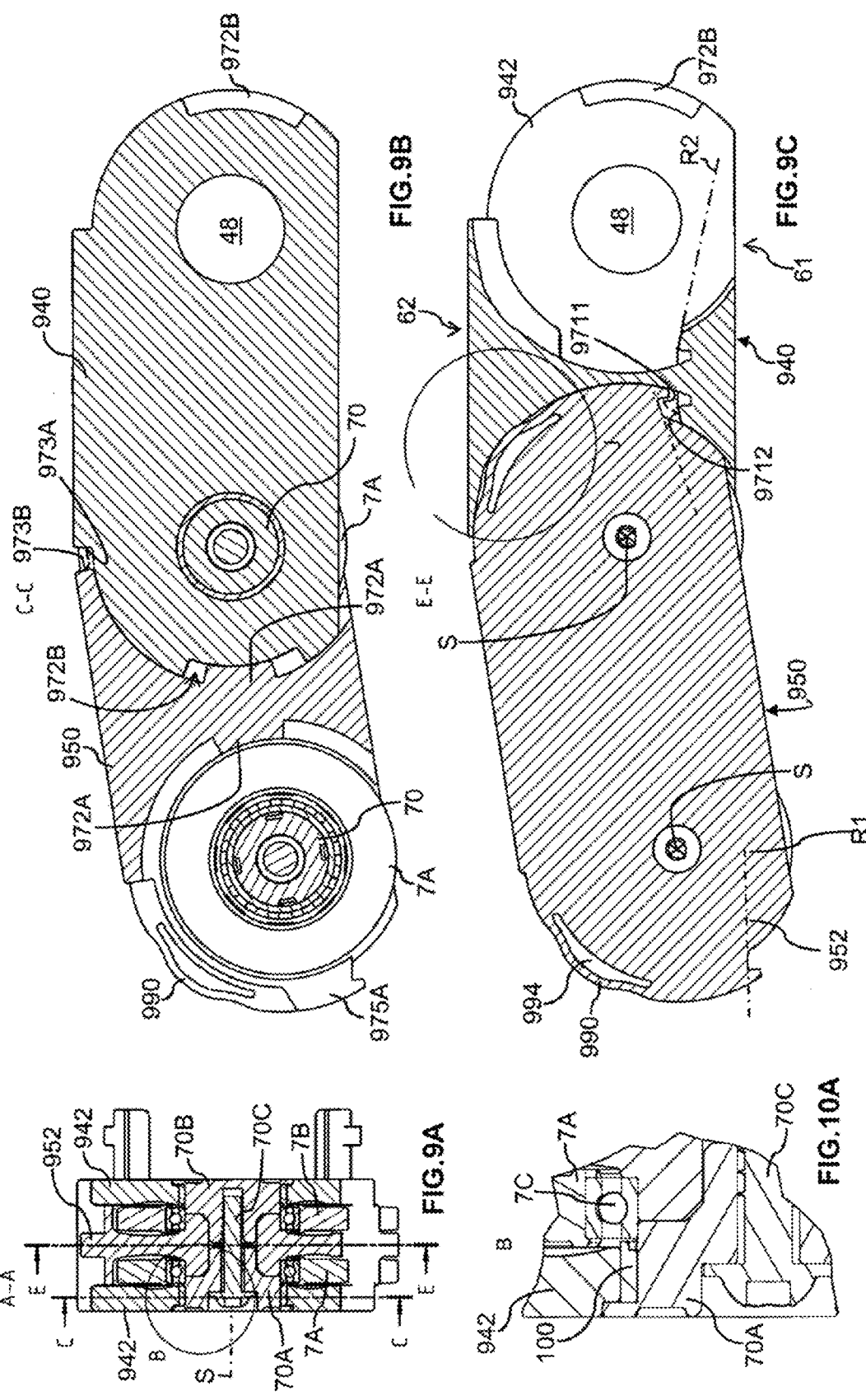

through its longitudinal centre plane (FIG. 4C), a bottom view (FIG. 4D) and a perspective view into the plate receiver (FIG. 4E);

FIGS. 5A-5B: perspective views (FIGS. 5A-5B) of a double plate or inner plate as second side part from FIGS. 3A-3B;

FIGS. 6A-6D: cross sections at the level of the pivot axis through a pair of two connected side parts, with two rollers (FIG. 6A), without rollers (FIG. 6B) with two separate sealing elements as well as, as an alternative to this, without rollers with a preformed sealing surface (FIG. 6C), as well as a perspective view of a sealing element (FIG. 6D) from FIG. 6B;

FIGS. 7A-7F: various sectional views of a side part pair according to the labelled section planes in the cross sections from FIG. 7A or FIG. 7D among other things to illustrate different pivot stops for limiting the pivot angle in the extended position (FIGS. 7A-7C) and in the completely bent position (FIGS. 7D-7F) to form the deflecting arc; and FIGS. 8A-8D: a second embodiment example of a side part according to the invention in the manner of a fork plate, in a perspective view from above (FIG. 8A), in a front view (FIG. 8B), in the central longitudinal section (FIG. 8C) and in a perspective view from below (FIG. 8D);

FIGS. 9A-9G: a third embodiment example of a side part pair or the labelled enlargements, in cross section (FIG. 9A), in three longitudinal sections (FIGS. 9B-9D), according to the labelled section planes in the cross sections from FIG. 9A, in enlargements (FIG. 9F: J, FIG. 9G: K) to illustrate a damping bridge in the two pivot positions from FIG. 9C and FIG. 9D and in a perspective view of the double plate of this example (FIG. 9E); and FIGS. 10A-10C: an enlargement from FIG. 9A as well as two perspective views to represent a development with sliding bearing rings for the swivel mounting on the hinge pin.

DETAILED DESCRIPTION

Figure 1:
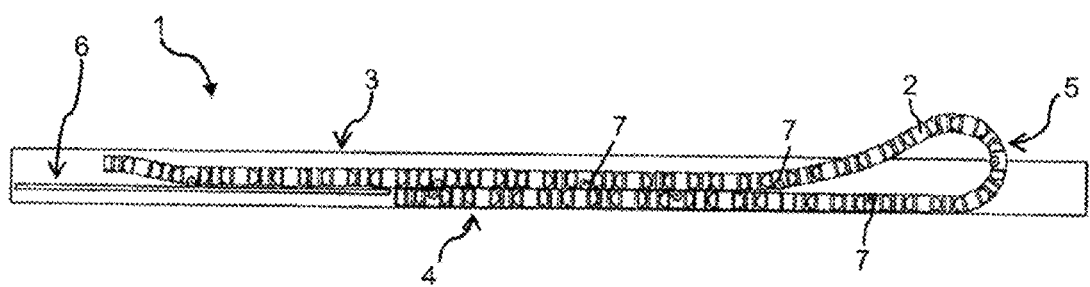
FIG. 1: a schematic side view of a rolling energy chain with rollers according to the state of the art.

FIG. 1 shows an energy chain 1 for guiding supply lines (not shown), with a number of chain links 2 connected to each other in an articulated manner, in a type known per se here, e.g. according to WO 99/57457 A1. The energy chain 1 is movable back and forth and variably forms a loop which comprises an upper run 3, a lower run 4 and a deflecting arc or deflection region 5 connecting these. In the example from FIG. 1, rollers 7 are provided at regular intervals, on selected chain links 2 of the upper run 3 and the lower run 4. The rollers 7 are arranged in such a way that they protrude beyond narrow sides, facing the inside of the loop, of the side parts in the direction of the respectively opposite run 3 or 4. The rollers 7 make it possible, during the movement of the energy chain 1, for the upper run 3 to roll on the one hand on the lower run 4 and where appropriate on the other hand on a separate supporting surface 6, e.g. on a guide channel.

Figure 2A:
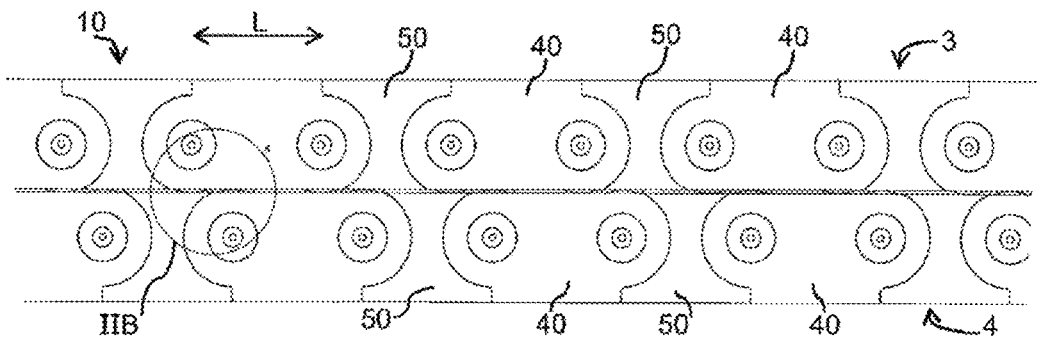
Figure 2D:
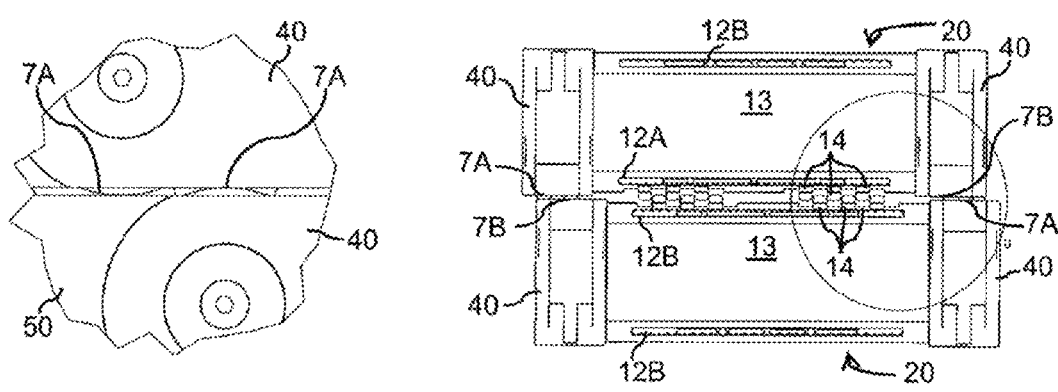
Figure 2D:
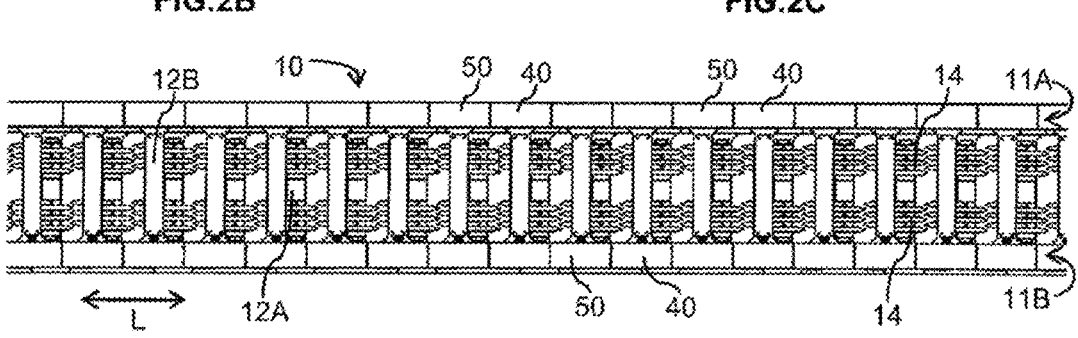

FIGS. 2A-2D show an example of an energy chain 10 according to the invention as a partial view in an operating situation, with an upper run 3 rolling on the lower run 4. Each of the chain links 20 consists of either two laterally opposite first side parts 40 or two laterally opposite second side parts 50, which are explained in more detail with reference to FIGS. 3-7. In the example shown, the first side parts 40 alternate with the second side parts 50 in the longitudinal direction L. The side parts 40, 50 are connected to each other in an articulated manner in the longitudinal direction to form strands 11A, 11B. The strands 11A, 11B are connected by inner cross bars 12A and outer cross bars 12B in the deflecting arc. For the rolling of the runs 3, 4, selected or all chain links 20 have integrated pairs of two rollers 7A, 7B, which protrude only slightly beyond the running surfaces or inner narrow sides. The rollers 7A, 7B are arranged lying protected inside in receivers in the chain links 20. In order to prevent a collision or jumping of opposite rollers 7A, 7B of the two runs 3, 4, comb-like guide elements 14, which mesh with each other during the movement of the runs 3, 4 and bring about a lateral offset of the upper run 3 with respect to the lower run 4, with the result that the rollers 7A, 7B roll past each other, are attached to the inner cross bars 12A of the chain links 20 (FIGS. 2C-2D). As FIG. 2A and FIG. 2D illustrate, each of the two strands 11A, 11B consists in each case of first side parts 40 and second side parts 50 which succeed each other in an alternating manner and which are designed differently.

FIGS. 3A-3B, FIGS. 4A-4F and FIGS. 5A-5B illustrate the structure of a connected pair of such side parts 40, 50 and their different design in detail. First of all, FIG. 3A, in conjunction with FIGS. 6A-6C, shows that the axis of rotation of both rollers 7A, 7B in each case coincides coaxially with the common pivot axis S of a pair of side parts 40, 50 (FIGS. 3A-3B), with the result that very large roller diameters D in relation to the total height H of the chain links (FIGS. 6A-6C) can be used.

The first side parts 40 are designed fork-like at both longitudinal ends or on the double end side, with two fork regions 40A, 40B, which are opposite in the longitudinal direction L and which have in each case a pair of laterally spaced-apart side walls 42. The side walls 42 form, in between them, a plate receiver 44 which is largely open in the longitudinal direction. The fork regions 40A, 40B project from a central region 40C of the plate body in a fork-like manner in the longitudinal direction and, viewed in a top view, roughly in the shape of an H. Overall, the first side part 40 is produced in one part or in one piece from plastic, alternatively a two-part design would be possible for the simplification of the moulds. On the side facing the receiving space 13 the central region 40C can comprise optional fastening lugs 45, preformed in one part, for the separate cross bars 12A, 12B.

The first side part 40 is advantageously designed mirror-symmetrical in relation to a transverse centre plane Q (FIG. 4D), with the result that it can be used in both strands 11A, 11B. This also applies correspondingly to the second side part 50 from FIGS. 3A-3B and FIGS. 5A-5B.

The second side parts 50, cf. FIGS. 5A-5B, are designed different from the first side parts 40, in particular are designed plate-like at both longitudinal ends. Each side part 50 has a body with two plate regions 50A, 50B, which are opposite in the longitudinal direction L or face away from each other, and which are connected by a central region 50C. The plate regions 50B are designed and intended for engagement with and for connection to the fork regions 40B of the first side parts 40, as FIG. 3A illustrates. The side parts 50 are likewise preferably in each case produced in one part as plastic injection-moulded parts.

In the plate regions 50A, 50B lateral depression recesses are provided on both sides as roller receivers, in which in each case one of the rollers 7A, 7B is received, cf. FIG. 3A. The plate regions 50A, 50B form sword-shaped plates 52, in each case for engagement in one of the fork regions 40A, 40B of the complementary first side part 40. Each plate region 50A, 50B has spigot rings 53 protruding coaxial with the pivot axes S on both sides for the rollers 7A, 7B, onto which e.g. ball bearings 7C for the rollers 7A, 7B are pressed, cf. FIGS. 6A-6C.

As FIGS. 6A-6C show best, the distance A from the pivot axis S to the inner narrow side 61 is much smaller than the distance B from the pivot axis S to the outer narrow side 62. The design shown at the same time allows the use of rollers 7A, 7B with comparatively larger roller diameter D than in the state of the art, here e.g. with D>0.6H, in particular D>0.75H.

The rollers 7A, 7B and ball bearings 7C are fastened to the side part 50 by means of a separate hinge pin 70. The hinge pin 70 consists of two pin parts 70A, 70B, which are screwed together (FIGS. 6A-6C), e.g. injection-moulded parts. As FIG. 6A shows, the ball bearings 7C are installed in a friction-locking manner on in each case one spigot ring 53 of the side part 50 by the pin parts 70A, 70B. For the installation of the pin parts 70A, 70B, a corresponding circular receiving opening 48 is provided in the side part 40 in each side wall 42. In each plate region 50A, 50B, the side part 50 has a receiving opening 58 with a smaller diameter for the connection of the pin parts 70A, 70B, e.g. by screw connection by means of screws 70C (cf. FIGS. 6A-6C) through the spigot rings 53.

In each case the two successive side parts 40, 50 are connected to each other pivotable relative to each other by the inserted hinge pin 70 (cf. FIG. 3A and FIGS. 6A-6C). For this, the two side walls 42 are mounted on the hinge pin 70 pivotable about the pivot axis S by means of their receiving openings 48 of the fork region 40A, 40B. Here, hinge pin 70, or its pin parts 70B, can be produced from a plastic which is different from the plastic of the side parts 50, e.g. a sliding bearing plastic with tribological additions.

Between the side walls 42 of each fork region 40A, 40B, the first side part 40 in each case has a guide groove 46 which is open towards the plate receiver 44 and which has laterally opposite transverse guide surfaces 46A, 46B (FIGS. 4D-4E) which extend in a circular arc shape about the pivot axis S.

The plate region 50A, 50B of the complementary side part 50 has a corresponding guide protrusion 56, which has circular-arc-shaped counterfaces 56A, 56B (FIG. 5B) for guiding on the transverse guide surfaces 46A, 46B and which engages in the guide groove 46 of the first side part 40. In the connected state (FIG. 3B), in each case a guide groove 46 and a guide protrusion 56 engaging therein cooperate over the entire pivot angle for the stabilization in the transverse direction.

As FIG. 5A shows, openings 59 are provided in each case on the underside, through which the installed rollers 7A, 7B can protrude towards the inside of the loop, on the lower narrow side 61 of the second side part 50 (cf. FIG. 6A). FIG. 6B and FIG. 6D show separate inserts 63 with sealing surfaces 64 for sealing the openings 59, when roller-free pairs of connected side part pairs are used. The inserts 63 can be fastened to the spigot ring 53 analogously to the ball bearings 7C. For this, FIG. 6C shows an alternative for or variant 50' of the second side part in which, instead of the openings 59 (FIG. 5A), sealing surfaces 69 are also formed on the plate regions 50A, 50B on the lower narrow side 61 in the injection-moulding process, unless all chain links 20 are to have rollers 7A, 7B. FIG. 6B furthermore shows discharge grooves 67 to the outer narrow sides 62, through which liquid, e.g. rainfall onto the lower run 4, can drain out of the inside, or which are advantageous for preventing dust accumulation.

FIG. 4A shows, on the lower narrow side of the first side part 40, two flat running surface sections 47A, 47AB which are continuous in the longitudinal direction L and which are formed by the side walls 42 or the central region 40C. FIG.

5A shows a running surface section 57, central here, which is flat and continuous in the longitudinal direction L and which is formed by the plates 52 and the central region 50C of the second side part 50 on the inner narrow side. In each case one of the rollers 7A, 7B can roll in a laterally offset manner on one of the running surface sections 47A, 47B or 57. The width of the running surface sections 47A, 47B or 57 in the transverse direction substantially corresponds to the roller width of tread (cf. FIG. 6A). The asymmetrical eccentric design of the side parts 40, 50 in the height direction or the asymmetrical design with respect to the distances A, B allows technically minimal gaps in the transition between the running surface sections 47A, 47B or 57 in the extended position of the runs 3, 4 (cf. FIG. 7C). In the extended configuration (FIGS. 7A-7C), the narrow side which faces the other run, i.e. the inner narrow side, can thereby form a substantially continuous running surface 47A, 47B or 57, on which the other run rolls with its rollers 7A, 7B in a particularly low-vibration and wear-free manner.

With reference to FIGS. 7A-7F, the limiting of the relative pivoting of two chain links 20 connected in an articulated manner, here consisting of side plates 40, 50 of the first embodiment example, is described below.

FIGS. 7A-7C illustrate the stop functions in the extended position of connected side parts 40, 50. In the case of the pair of side parts 40, 50 represented in FIGS. 7A-7C, both connected side parts 40, 50 have at least three pairs of cooperating extension stop surfaces arranged distributed about the pivot axis S, which is defined by the hinge pin 70. One extension stop pair is formed by respective front faces 73A, 73B, which are in contact in the extended position, as stop and counterstop surfaces. The front faces 73A, 73B in each case lie perpendicular to the longitudinal direction in the extended position and roughly vertically above the pivot axis S (FIG. 7B). A second extension stop pair is formed by a first stop protrusion 71A on the second side part 50, which engages in a stop recess 71B of the first side part 40. A first stop surface 711 on the stop protrusion 71A, which is in contact with a first counterstop surface 712 of the stop recess 71B, cooperate respectively as stop surfaces in in the extended position. As a third stop pair, in each case a second stop protrusion 72A, which engages in a corresponding one of two stop recesses 72B of the second side part 50, is provided on each side wall 42 of the first side part 40, as shown in more detail in FIG. 7C. In the extended position, a first stop surface 721 on the stop protrusion 72A here is in contact with a first counterstop surface 722 of the stop recess 72B (FIG. 7C). The arrangement of recesses and protrusions can also be reversed in relation to the side parts 40, 50. The engagement of stop protrusions 72A in stop recesses 72B offers additional lateral stability, here in particular in every pivot position.

As FIGS. 7B-7C show, the stop surfaces of the three stop pairs 71A-71B, 72A-72B, 73A-73B are arranged approximately equally distributed in terms of angle about the pivot axis S, here with an angle distance of roughly 120°, but this is not imperative. Through several extension stop pairs 71A-71B, 72A-72B, 73A-73B, a large total surface area is achieved and among other things the hinge pin 70 is at least partially load-relieved with respect to forces which arise in the extended position or in particular in the slack transition from the deflecting arc 5 towards the rolling straight run. A possible pretensioning of the strands or side parts 40, in the extended position through a corresponding arrangement of the stops is not recognizably represented in FIGS. 7A-7C.

As FIG. 7B furthermore shows, the first stop protrusion 71A, here e.g. on the second side part 50, is designed hook-shaped and engages behind the other, here the first, side part 40. Each of the two first stop protrusions 71A forms a draw hook 75A which, in the extended pivot position (extended position), engages in a corresponding cutout 75B on the other side part 40 for the purposes of tensile force transmission. Through this design—which is significant for the invention in itself—an advantageous tensile force load relieving of the hinged connection between the chain links can be achieved, quite generally in the case of any type of energy chain. This design with draw hook 75A and cooperating cutout 75B on the connected side part 40, 50, however, is advantageous particularly in the case of very long energy chains or travels.

As FIG. 5A shows best, the hook-shaped protrusion for the tensile force transmission, or draw hook 75A, preferably extends in the transverse direction over the entire maximum width of the plate region 52 of the side part 50, i.e. over the maximally possible width, which achieves advantageous force transmission or load capacity. Correspondingly, the cutout 75B on the other side part 40 is extended over the entire width of the plate receiver 44 (cf. FIG. 4E).

FIGS. 7D-7F illustrate the stop functions in the completely bent position of connected side parts 40, 50, when they are located in the deflecting arc 5 (FIG. 1). Here, in each case a second stop surface 713 on the stop protrusion 71A is in contact with a second counterstop surface 714 of the stop recess 71B and, at the same time, on each side wall 42, in each case a second stop surface 723 on the stop protrusion 72A is in contact with a second counterstop surface 724 of the stop recess 72B. The position of these surfaces, i.e. geometry of the two stop pairs 71A-71B, 72A-72B, determines the maximum pivot angle between the two side parts 40, and thus the radius of the deflecting arc 5.

FIGS. 8A-8D show a second alternative embodiment of the invention, in which the strands are constructed from successive identical side parts 80, which are designed as single-sided fork plates or Y fork plate.

The side part 80, corresponding to the design of the fork regions 40A, 40B of the first side parts 40 from FIGS. 2-7, at one end has a fork region 80A, which has a pair of laterally spaced-apart side walls 42, with a plate receiver 44 in between. At the other end the side part has a plate region 80B, corresponding to the design of the plate regions 50A, 50B of the second side parts 50 from FIGS. 2-7.

The plate region 80B can thus engage in the plate receiver 44 of a side part 80 following in the longitudinal direction and be connected to this pivotally in the above-described manner by means of a hinge pin 70 (not shown). The rollers 7A, 7B are likewise not shown, wherein the structure or the design in cross section can, however, correspond to FIGS. 6A-6C.

The side part 80 in particular also has continuous running surface sections 87A, 87B, 87C, as well as three pairs 71A-71B; 72A-72B; 73A-73B, arranged distributed about the pivot axis, of cooperating stop surfaces which, in the extended pivot position of connected side parts are in contact and are arranged approximately equally distributed in terms of angle about the pivot axis S.

Furthermore, the side part 80 likewise advantageously has a draw hook 75A which, in the extended pivot position of connected side parts 80, can engage in a cutout 75B on the other side part 80 for the purposes of tensile force transmission, as can be seen from FIG. 8C.

Further features, provided with corresponding reference numbers, in FIGS. 8A-8D correspond to those which have already been described with regard to FIGS. 2-7 and are not described again for the sake of brevity.

FIGS. 8A-8D thus show an alternative side part 80, the design of which has a plate region 80B, similar or identical to the plate region 50A, 50B of the side part 50, and, opposite, a fork region 80A, similar or identical to the fork regions 40A, 40B. The side part 80 is thus not mirror-symmetrical relative to the transverse plane Q, wherein nevertheless in each case the same side parts 80 can, where appropriate, be used in each of the strands 11A, 11B.

FIGS. 9A-9G show a further-developed embodiment, namely a modification or variant of the first example from FIGS. 3-7, with different side parts, namely first side parts 940 and second side parts 950. For the sake of brevity, only the substantial differences from the example in FIGS. 3-7 are explained in more detail, wherein corresponding reference numbers in FIGS. 9A-9G denote corresponding features from FIGS. 3-7.

A first difference relates to the stop system with the pairs of stops 971A-971B, 972A-972B, 973A-973B with cooperating stop surfaces. The stop system of the third embodiment example differs mainly through interchanging of the arrangement of stop protrusion 972A on the second side part 950 and the stop recess 972B on the inside on the front sides of the side walls 942 or the fork regions of the first side part 950. The geometrical arrangement of the stop surfaces is otherwise largely identical to FIGS. 3-7, including the use of a draw hook 975A and a corresponding cutout 975B. An advantage of the arrangement of the stop protrusions 972A on the second side part 950 and the stop recesses 972B in each case on the inside on the front sides of the side walls 942 is the simplification of the tool for the production by injection moulding. A common feature with FIGS. 3-7 is that the first stop surfaces 9711 of the stop protrusion 971A, which are arranged towards the inner narrow side 61 in relation to the neutral fibre, and the first counterstop surfaces 9712 of the stop recess 971B have a particular orientation also in the example from FIGS. 9A-9E, as in FIGS. 3-7. To achieve a type of wedge action in the extension stop or pretensioned position (not shown here, cf. FIG. 7B), the first stop surfaces 9711 and first counterstop surfaces 9712 are not oriented radially relative to the pivot axis S, but form an angle relative to a corresponding radius, namely in such a way that these surfaces are arranged sloping down towards a vertical through the pivot axis S in the direction of the inner narrow side 61, as illustrated by the lines of direction R1, R2 in FIG. 9C and FIG. 9D. This brings about an improved flow of forces or among other things an improved action of the draw hook 975A, for the load relieving of the hinge pins 70.

A second difference is an additionally provided stop damping. For this, as damping means, an arc-shaped damping bridge 990 is provided, which protrudes in the radial direction in relation to the pivot axis S from the guide protrusion 956 on the second side part 950 in the guide protrusion 956 and projects radially beyond the outer radius of the guide protrusion 956 (FIG. 9C). The damping bridge 990 is provided in one part with the guide protrusion 956 on the side part 950. For the deformability of the damping bridge 990, a cutout or an aperture 994, which forms a free space in which the damping bridge 990 can get out of the way during deformation, is provided in the guide protrusion 956.

As can best be seen from FIGS. 9F-9G, the damping bridge 990 cooperates with a corresponding depression 993 in the other side part 940. The depression 993 is provided in or on the guide groove 946. In a central region of the depression 993, the damping bridge 990 is movable or freely pivotable without deformation over a desired pivot range, cf. FIG. 9C in conjunction with FIG. 9G.

As shown in more detail in FIGS. 9F-9G, the depression 993 is shaped such that the body of the first side part forms sloping or curved approach surfaces 991, 992 in the manner of ramps for the damping bridge 990. Damping bridge 990 and depression 993 are designed symmetrical, with the result that the damping bridge 990 is effective in both pivot directions, i.e. in the direction of the extended position (not shown here: cf. FIGS. 7B-7C) and in the direction of the completely bent relative position (not shown here: cf. FIGS. 7E-7F) of the side parts 940, 950. The damping bridge 990 is pressed against the approach surfaces 991, 992 before reaching the fully extended or fully bent position and deformed in a bending elastic manner. The pivoting movement is hereby slowed down or damped. The design is chosen such that damping of the pivoting movement only occurs in the end region of the pivoting movement, e.g. in the case of approx. 5° angular dimension before reaching the two stop positions (cf. FIGS. 7A-7F).

FIGS. 10A-10C show a further possible improvement, which is optionally applicable to all embodiment examples. Sliding bearing bushings or rings 100, which make a favourable material pairing with the pin parts 70A, 70B or more favourable material selection of the pin parts 70A, 70B possible in order to increase the lifespan, can cooperate with the pin parts 70A, 70B and be installed. A sliding bearing ring 100 made of a tribologically optimized material, e.g. a tribopolymer, can be provided on each pin part 70A, 70B, as shown in FIG. 9A and FIG. 10A. The sliding bearing rings 100 improve the pivotable mounting (in the manner of a pin/hole mounting) of the side walls 42 or their receiving openings 48 on the hinge pin 70. For this, each sliding bearing ring 100 is arranged rotatably on the hinge pin 70, e.g. held by catch elements 70D and fastened in a torque-proof manner on the respective side wall 42 after fastening of the pin parts 70A, 70B by means of a tapping screw 70C (FIG. 9A), with the result that the relative rotation is not effected between the edge of the receiving openings 48 and the hinge pins 70, but between sliding bearing ring 100 and hinge pin 70. With the aid of the pin parts 70A, 70B, sliding bearing rings 100 with a slight oversizing can be easily pressed or fitted into the receiving openings 48.

Finally, FIGS. 10A-10B, together with FIG. 9E, illustrate another simple design for the torque-proof installation of the pin parts 70A, 70B on the spigot ring 953 of the side parts 950. For this, lugs 70E can cooperate in a positive-locking manner with corresponding depressions in the spigot rings 953. At the same time, during the installation, an anti-twist protection of the pin part 70B with core hole 70F is thereby achieved for the tapping screw 70C.

LIST OF REFERENCE NUMBERS/KEY

FIG. 1
1 energy chain
2 chain link
3 upper run
4 lower run
5 deflecting arc
6 supporting surface
7 rollers
FIGS. 2A-2D and FIG. 3A-FIG. 6C
7A, 7B rollers
7C ball bearing
10 energy chain
11A, 11B strand

12A, 12B cross bar
13 receiving space (for lines)
14 comb-like guide elements
20 chain link
40 side part (first type)
40A, 40B fork region
40C central region
42 side wall
44 plate receiver
45, 55 fastening lug
46 guide groove
46A, 46B transverse guide surfaces
47A, 47B running surface section
48 receiving opening (for pin part)
50 side part (second type)
50A, 50B plate region
50C central region
52 plate
53 spigot ring
56 guide protrusion
56A, 56B counterface
57 running surface section
58 receiving opening (for pin part)
59 opening (for roller)
61 inner narrow side
62 outer narrow side
63 insert
64, 69 sealing surface
67 discharge groove
70 hinge pin
70A, 70B pin part
70C screw
A distance to the inside
B distance to the outside
D roller diameter
L longitudinal direction
S pivot axis
Q transverse centre plane
FIGS. 7A-7F
70C screw
71A stop protrusion
71B stop recess
72A stop protrusion
72B stop recess
73A, 73B stop pair or front faces
75A draw hook
75B cutout (for draw hook)
711, 721 first stop surface
712, 722 first counterstop surface
713, 723 second stop surface
714, 724 second counterstop surface
FIGS. 8A-8D:
80 side part
80A fork region (=40A, 40B)
80B plate region (=50A, 50B)
87A, 87B, 87C running surface sections
FIGS. 9A-9G:
7A, 7B roller
48 receiving opening
61, 62 narrow side
940 side part (first type)
942 side wall
950 side part (second type)
956 guide protrusion
971A-971B, 972A-972B, 973A-973B stops
975A draw hook
975B cutout (for draw hook)

9711 first stop surface (orientation R1)
9712 first counterstop surface (orientation R2)
990 damping bridge
991, 992 approach surfaces (for damping bridge)
993 depression (for damping bridge)
994 aperture/cutout
S pivot axis
FIGS. 10A-10C (and FIG. 9A)
7A roller
7C ball bearing
70 hinge pin
70A, 70B pin part
70C tapping screw
70D catch element
70E core hole
100 sliding bearing ring
S pivot axis

What is claimed is:

1. An energy chain for guiding lines, wherein the energy chain is movable such that the energy chain forms an upper run, a lower run and a deflection region connecting the upper and lower runs, the energy chain comprising:

a plurality of side parts which are connected in a longitudinal direction to form two strands, the two strands being parallel to each other;

cross bars connecting the two strands to each other;

wherein each two side parts of the plurality of side parts neighbouring in the longitudinal direction constitute in each case a pair of side parts pivotable with respect to each other about a common pivot axis;

wherein rollers are provided at at least some of the pairs of side parts for a rolling movement of the energy chain, wherein an axis of rotation of a roller in each case coincides with the common pivot axis of the pair of side parts, wherein the plurality of side parts includes first and second side parts, wherein each of the two strands consists of the first and the second side parts succeeding each other in an alternating manner, wherein the first side parts each have two fork regions, which are opposite in the longitudinal direction, wherein each fork region has a pair of laterally spaced-apart side walls with a plate receiver in between, and wherein the second side parts each have two plate regions, which are opposite in the longitudinal direction and which in each case engage in a plate receiver of a neighbouring one of the first side parts; or each side part of the plurality of side parts comprises, opposite in the longitudinal direction, a fork region, which has a pair of laterally spaced-apart side walls with a plate receiver in between, and a plate region, which engages in a plate receiver of a neighbouring side part of the plurality of side parts.

2. The energy chain according to claim 1, wherein each side part of the plurality of side parts in each case has an inner narrow side facing the respectively other run and an outer narrow side facing away, wherein a distance from the pivot axis to the inner narrow side is smaller than a distance from the pivot axis to the outer narrow side.

3. The energy chain according to claim 1, wherein each side part of the plurality of side parts is produced in one part from plastic.

4. The energy chain according to claim 1, wherein, in relation to one of the pairs of side parts, one side part of the pair of side parts forms a guide groove between the side walls of the fork region, wherein the guide groove is open towards the plate receiver and has laterally opposite transverse guide surfaces which extend in a circular arc shape about the pivot axis, wherein the plate region of the other side part of the pair of side parts engages in the guide groove with at least one guide protrusion, which has circular-arc-shaped counterfaces for guiding on the transverse guide surfaces.

5. The energy chain according to claim 1, wherein, in relation to one of the pairs of side parts, both side parts of the pair of side parts have at least three pairs of cooperating stop surfaces arranged distributed about the pivot axis, wherein the cooperating stop surfaces are in contact in an extended pivot position of the pair of side parts.

6. The energy chain, according to claim 1, wherein, in relation to one of the pairs of side parts, one side part of the pair of side parts has a draw hook which, in an extended pivot position of the pair of side parts, engages in a cutout on the other side part of the pair of side parts for the purposes of tensile force transmission.

7. The energy chain according to claim 1, wherein the rollers are in each case received in receivers between the side parts of the pair of side parts and protrude partially or only slightly beyond narrow sides of the side parts.

8. The energy chain according to claim 7, wherein each one of the rollers is arranged in a respective plate receiver between a side wall of a fork region and a plate region engaging in the plate receiver, wherein in each case one roller is provided on each side of the plate region in the plate receiver on the respective pair of side parts, wherein, on an inner narrow side of the pair of side parts, facing the respectively other run, at least one side wall of the pair of side walls of the fork region and the plate region in each case forms a section of the running surface for one of two rollers.

9. The energy chain according to claim 1, wherein side parts of the plurality of side parts in each strand are in each case connected to each other by a separate hinge pin.

10. The energy chain according to claim 9, wherein the two side walls of each fork region and the plate region in each case have a continuous receiving opening for a separate hinge pin and are connected to each other in a relatively pivotable manner by an inserted hinge pin.

11. The energy chain according to claim 9, wherein:

at least one pin part of the separate hinge pin is connected in a torque-proof manner to the plate region, and/or the two side walls are mounted on the separate hinge pin pivotable about the pivot axis by means of their receiving openings of the fork region; and/or the rollers are in each case mounted rotatably on the hinge pin.

12. The energy chain according to claim 9, wherein on the hinge pin in each case a sliding bearing ring is provided for the pivotable mounting of the side walls.

13. The energy chain according to claim 1, wherein the first side parts in both strands are identically constructed and the second side parts in both strands are identically constructed, wherein the first and the second side parts are shaped substantially mirror-symmetrical or functionally symmetrical with respect to their transverse centre plane.

14. The energy chain according to claim 1, wherein an external diameter of the rollers is at least 50% of a height of any side part of the plurality of the side parts.

15. The energy chain according to claim 1, wherein comb-like guide elements, which engage with each other during movement and bring about a lateral offset of the upper run with respect to the lower run, with the result that the rollers roll past each other, are present on the outside on the cross bars which face the respectively other run.

16. An energy chain for guiding lines, wherein the energy chain is movable such that the energy chain forms an upper run, a lower run and a deflection region connecting the upper and lower runs, the energy chain comprising:

a plurality of side parts which are connected in a longitudinal direction to form two strands, the two strands being parallel to each other;

cross bars connecting the two strands to each other;

wherein each two side parts of the plurality of side parts neighbouring in the longitudinal direction constitute in each case a pair of side parts pivotable with respect to each other about a common pivot axis; wherein the plurality of side parts includes first and second side parts, wherein each of the two strands consists of the first and the second side parts succeeding each other in an alternating manner, wherein the first side parts each have two fork regions, which are opposite in the longitudinal direction, wherein each fork region has a pair of laterally spaced-apart side walls with a plate receiver in between, and wherein the second side parts each have two plate regions, which are opposite in the longitudinal direction and which in each case engage in a plate receiver of a neighbouring one of the first side parts; or each side part of the plurality of side parts comprises, opposite in the longitudinal direction, a fork region, which has a pair of laterally spaced-apart side walls with a plate receiver in between, and a plate region, which engages in a plate receiver of a neighbouring side part of the plurality of side parts; wherein in relation to one of the pairs of side parts, one side part of the pair of side parts forms a guide groove between the side walls of the fork region, wherein the guide groove is open towards the plate receiver and has laterally opposite transverse guide surfaces which extend in a circular arc shape about the pivot axis, wherein the plate region of the other side part of the pair of side parts comprises at least one guide protrusion, which has circular-arc-shaped counterfaces for guiding on the transverse guide surfaces, wherein the at least one guide protrusion engages in the guide groove.

17. The energy chain according to claim 16, comprising an arc-shaped damping bridge, which protrudes in the radial direction from the guide protrusion, wherein the damping bridge cooperates with approach surfaces of a corresponding depression in the guide groove.

18. The energy chain according to claim 16, wherein, in relation to a pair of side parts, one of the two side parts has a draw hook which, in the extended pivot position of the pair of side parts, engages in a cutout on the other one of the two side parts for the purposes of tensile force transmission.

19. The energy chain according to claim 16, wherein the energy chain comprises rollers at at least some of the pairs of side parts for rolling the upper run on the lower run and an axis of rotation of a respective roller coincides with the common pivot axis of the respective pair of side parts.

20. A crane system comprising an energy chain according claim 1.

\* \* \* \* \*